(No Model.)  2 Sheets—Sheet 1.
S. L. HALL.
APPARATUS FOR MIXING DOUGH.
No. 500,656. Patented July 4, 1893.
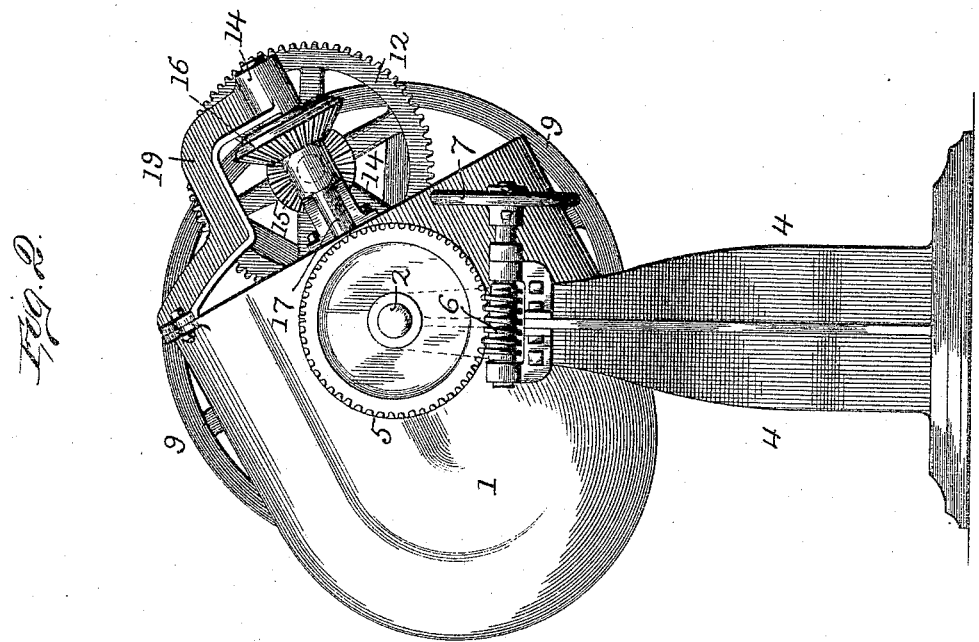
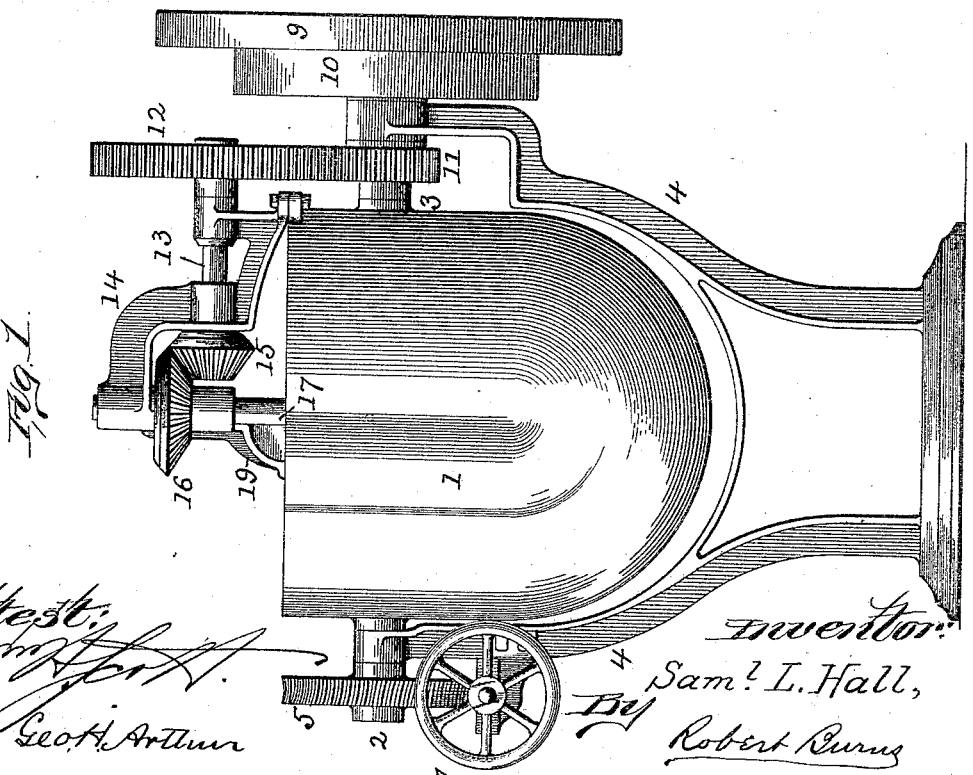
Attest:
Wm. H. Scott
Geo. H. Arthur
Inventor:
Sam'l L. Hall,
By Robert Burns
Atty

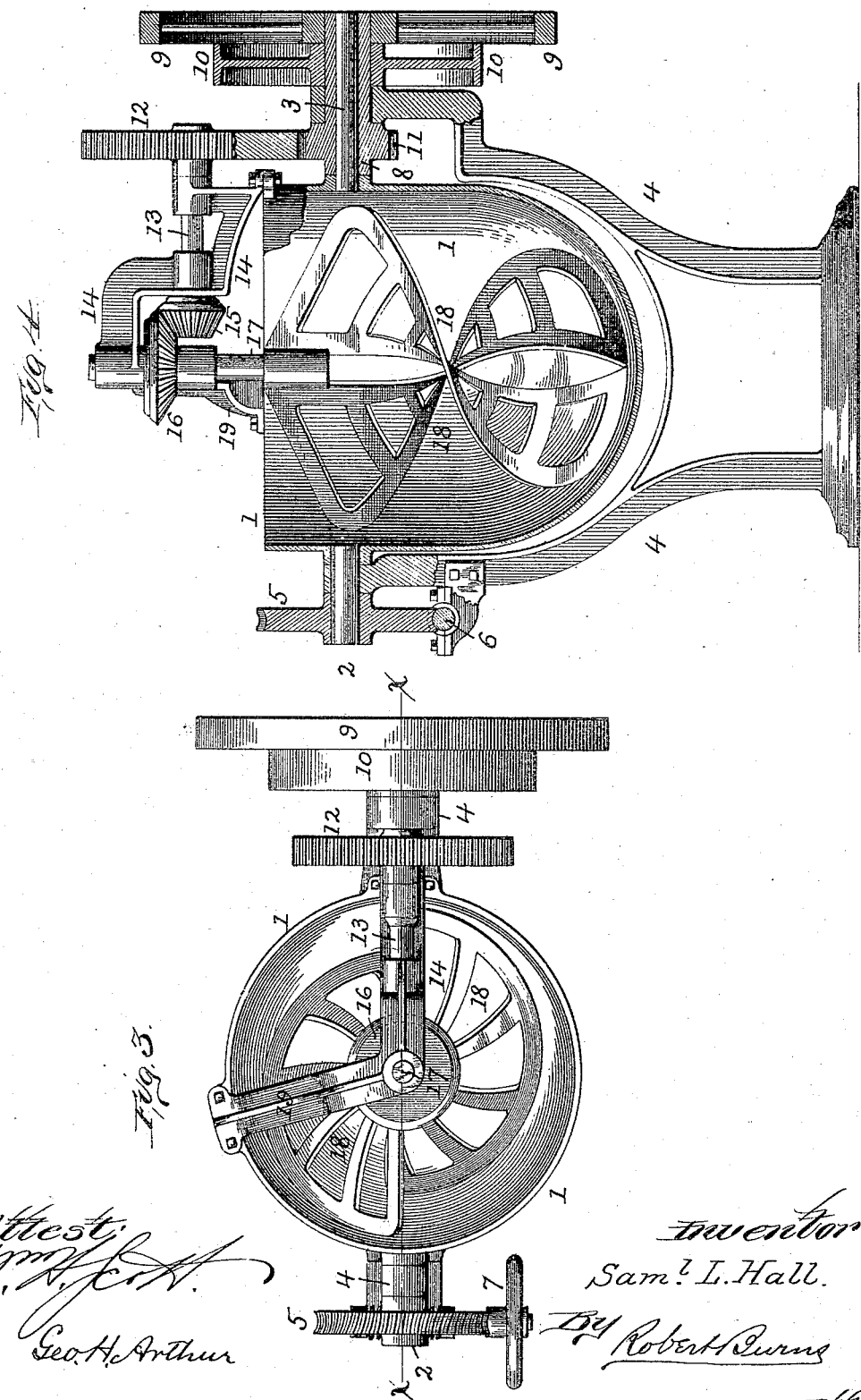

UNITED STATES PATENT OFFICE.

SAMUEL L. HALL, OF CHICAGO, ILLINOIS.

APPARATUS FOR MIXING DOUGH.

SPECIFICATION forming part of Letters Patent No. 500,656, dated July 4, 1893.

Application filed October 20, 1892. Serial No. 449,470. (No model.)

*To all whom it may concern:*

Be it known that I, SAMUEL L. HALL, a citizen of the United States, residing at Chicago, in the county of Cook and State of Illinois, have invented certain new and useful Improvements in Apparatus for Mixing Dough, &c.; and I do hereby declare the following to be a full, clear, and exact description of the same, reference being had to the accompanying drawings, forming part of this specification.

This invention relates more particularly to that type of dough mixers in which the mixing blades or paddles, are carried by an upright shaft and are adapted to rotate in a horizontal plane within the mixing vessel or trough, the walls of which are concentric with the axis of rotation of the mixing blades, the objects of the present improvement being: first, to afford an improved mixing mechanism with which the dough material, as it is moved around in a circular path by the mixing blades, will constantly tend to move from its circular path and be retarded in its travel by contact with one side of the mixing vessel or trough, so that the mixing blades will perform a constantly recurring lifting and kneading operation on the dough material, that is very efficient in attaining a thorough mixing or kneading of such material, and with which the degree or amount of such retarding action can be regulated to suit the constantly changing condition of the dough in its transition from a crude mixture of flour, water, &c., into finished dough; second, to provide an improved arrangement of the mixing blades of a dough mixer and operating mechanism thereof, whereby a gradual tilting of the mixing trough can be effected, during the continued rotative action of the mixing blades, so that the desired inclination from the vertical, required during the mixing operation, as well as a complete tilting of the trough in the operation of discharging the finished dough, can be effected during the continued action of the driving mechanism. I obtain such objects by the construction and arrangement of parts illustrated in the accompanying drawings, in which—

Figure 1, is a front elevation of my improved mixer with the parts shown in a vertical position; Fig. 2, a side elevation of the same with the parts in an inclined or canted position; Fig. 3, a top plan; and Fig. 4, a longitudinal sectional elevation at line $x$—$x$, Fig. 3.

Similar numerals of reference indicate like parts in the several views.

Referring to the drawings, 1, represents the upright mixing trough or vessel of an open-topped cylindrical shape, with a semi-spherical bottom, and provided with trunnion pins 2 and 3 near its top, that are arranged diametrically opposite to each other, and by which the trough is pivotally supported in the bifurcated upper part of the main support or standard 4 of the apparatus.

The trunnion pin 2 at one side of the apparatus bears directly in a box formation in the adjacent upper branch of the main support and on its outer end carries a worm sector or wheel 5, that is engaged by an endless screw or worm 6, journaled on the main support and provided with a hand wheel 7, so as to afford ready means for adjusting and holding the mixing trough to any desired position. The trunnion pin 3 at the other side of the apparatus does not bear directly in the box formation in the adjacent branch of the main support, but in the hub extension 8 of the driving gear, which has bearing in such box formation, as illustrated in Fig. 4.

The hub extension 8 carries on its outer end the ordinary fly wheel 9 and driving pulley 10, and on its inner end a pinion 11, that meshes with and drives a spur wheel 12 upon the outer end of a countershaft 13, journaled in an arched bracket frame 14 secured to the top of the mixing trough; at its inner end the countershaft 13 carries a bevel gear 15 that meshes with and drives a bevel gear 16 upon the carrying shaft 17 of the mixing blades 18, such carrying shaft having its bearing in the arched frame 14, as shown.

With the above described arrangement of the driving mechanism motion is received into the apparatus around the pivotal axis of the mixing trough, and from thence transmitted to the mixing blades by which means the pivotal adjustment of the mixing trough can be accomplished without in any way affecting the movement of such driving mechanism.

The mixing blades 18 may be of any suitable and well known construction. As the most suitable I illustrate a pair of counterpart spiral blades, of a reticulated construction and having an outer formation approximating the interior of the mixing trough, and preferably, with the outer periphery of the spiral having a very close approximation to the inner periphery or wall of the mixing trough.

The arched frame 14 I make of an angular form, as shown in Fig. 3, the main portion forming the bearing for the countershaft 13, being radial to the axis of the apparatus, &c., while the angular extension 19 has a radial arrangement at approximately a right angle to the main portion of the frame, the purpose being to leave the greater part of the mouth of the mixing trough unobstructed, and so that ready and convenient access can be had to the interior of the trough in removing the dough, cleaning out the trough, &c.

In the practical operation of my improved apparatus, after the dough materials are introduced and the parts are put in motion, the operator will adjust the trough to the desired inclination from the vertical, best adapted to effect a mixing operation by means of the hand wheel 7 and worm gearing 5, 6, and by changing such inclination as the mixing operation progresses, until the same is completed, when by canting the trough to a horizontal position, the continued motion of the mixing blades, will discharge the finished dough into a suitable receiver at the side of the apparatus.

In practice, I have found that in mixing dough a greater degree of inclination of the mixing trough is required at the initial part of the mixing operation, and that such inclination can be decreased as the mixing operation progresses until the same is completed, when the mixing trough can be tilted to a horizontal position to discharge the finished dough.

Having thus fully described my said invention, what I claim as new, and desire to secure by Letters Patent, is—

1. In an apparatus for mixing dough &c., the combination of an upright mixing trough 1, the walls of which are concentric with the vertical axis, and the supporting frame or standard 4 pivotally connected to the trough, with mixing blades 18 and the operating gearing therefor, the driving gear of which has its axis of rotation on a line with the pivoted axis of the mixing trough, substantially as set forth.

2. In an apparatus for mixing dough, &c., the combination of an upright mixing trough 1, and its supporting standard 4, pivotally connected together, with the mixing blades 18, the arched supporting frame 14, composed of a main portion and a branch portion 19, having an angular arrangement therewith, and the operating gearing for the mixing blades, substantially as set forth.

3. In an apparatus for mixing dough, &c., the combination of an upright mixing trough 1, and its supporting standard 4, pivotally connected together, with the mixing blades 18, the arched supporting frame 14, composed of a main portion and a branch portion 19 having an angular arrangement therewith, the bevel gears 15 and 16, counter shaft 13, gear wheel 12 and driving pinion 11, the axis of which is on a line with the pivotal axis of the mixing trough, substantially as set forth.

4. In an apparatus for mixing dough, &c., the combination of an upright mixing trough 1, and its supporting standard 4, pivotally connected together, the mixing blades 18, a frame or spider attached to the margin of the trough 1, and having a centrally arranged hub for the support of the shaft of the mixing blades, the bevel gears 15 and 16, countershaft 13 gear wheel 12, driving pinion 11, trunnion pin 2, worm sector or wheel 5, endless worm 6, and hand wheel 7, substantially as set forth.

In testimony whereof witness my hand this 17th day of October, 1892.

SAMUEL L. HALL.

In presence of—
ROBERT BURNS,
GEO. H. ARTHUR.